United States Patent
Park et al.

(10) Patent No.: US 9,333,559 B2
(45) Date of Patent: May 10, 2016

(54) CONVERGENCE MACHINING APPARATUS BASED ON TURNING

(71) Applicant: KOREA INSTITUTE OF MACHINERY & MATERIALS, Daejeon (KR)

(72) Inventors: Jong-Kweon Park, Daejeon (KR); Seung Kook Ro, Daejeon (KR); Byung-Sub Kim, Daejeon (KR); Sung Cheul Lee, Daejeon (KR); Sung-Kwon Jang, Daejeon (KR); Kyung Han Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 114 days.

(21) Appl. No.: 14/220,233

(22) Filed: Mar. 20, 2014

(65) Prior Publication Data
US 2015/0101466 A1 Apr. 16, 2015

(30) Foreign Application Priority Data

Oct. 15, 2013 (KR) .................... 10-2013-0122645
Oct. 15, 2013 (KR) .................... 10-2013-0122646

(51) Int. Cl.
*B23Q 39/00* (2006.01)
*B23B 3/06* (2006.01)
*B23Q 41/08* (2006.01)

(52) U.S. Cl.
CPC . *B23B 3/065* (2013.01); *B23B 3/06* (2013.01); *Y10T 82/2531* (2015.01)

(58) Field of Classification Search
CPC .......... B23B 3/06; B23Q 1/017; B23Q 39/026
USPC .................................................. 82/129, 141
See application file for complete search history.

(56) References Cited

U.S. PATENT DOCUMENTS

| 1,706,544 | A | * | 3/1929 | Reid | B23Q 5/52 24/68 B |
| 2,194,729 | A | * | 3/1940 | Wills | B23Q 5/22 82/137 |
| 2,450,788 | A | * | 10/1948 | Foster | B23Q 5/34 116/230 |
| 2,903,933 | A | * | 9/1959 | MacKenzie | B23G 1/04 82/110 |
| 2,986,055 | A | * | 5/1961 | Kasselmann | B23Q 35/08 82/11.1 |
| 3,262,347 | A | * | 7/1966 | Carroll | B23Q 5/22 82/137 |
| 3,448,643 | A | * | 6/1969 | Kylin | B23Q 5/06 82/133 |
| 4,130,033 | A | * | 12/1978 | Tsuchiya | B23B 9/00 29/27 C |
| 6,286,402 | B2 | * | 9/2001 | Crudgington | B23B 3/06 82/1.11 |
| 6,314,847 | B1 | | 11/2001 | Nakaminami | |

(Continued)

FOREIGN PATENT DOCUMENTS

DE 102009032448 1/2010
JP 58-109201 6/1983

(Continued)

*Primary Examiner* — Will Fridie, Jr.
(74) *Attorney, Agent, or Firm* — Lex IP Meister, PLLC

(57) ABSTRACT

Disclosed is a convergence machining apparatus based on turning in which a rotation center of a work piece to a headstock and a footstock and a slide surface of first and second beds mounted with a reciprocal carriage, the headstock, and the footstock are positioned on the same virtual line when viewed from a direction parallel with a rotation axis of the work piece, thereby preventing an offset error in processing due to a relative displacement between the work piece and a tool installed at the reciprocal carriage.

13 Claims, 16 Drawing Sheets

(56) References Cited

U.S. PATENT DOCUMENTS

| | | | |
|---|---|---|---|
| 7,845,257 B2 * | 12/2010 | Kim | B23Q 1/015 29/27 C |
| 8,801,345 B2 | 8/2014 | Yoshino | |
| 2006/0207396 A1 | 9/2006 | Hiramoto | |
| 2006/0207397 A1 | 9/2006 | Hiramoto | |
| 2007/0173178 A1 | 7/2007 | Tanner | |
| 2009/0320656 A1 * | 12/2009 | Sasu | B23B 3/06 82/129 |
| 2009/0320657 A1 | 12/2009 | Miller | |
| 2010/0005936 A1 | 1/2010 | Yoshino | |
| 2012/0065768 A1 | 3/2012 | Sakata | |
| 2014/0216218 A1 | 8/2014 | Yoshino | |

FOREIGN PATENT DOCUMENTS

| | | |
|---|---|---|
| JP | 63-283804 | 11/1988 |
| JP | 3650706 | 11/2000 |
| JP | 2003-225806 | 8/2003 |
| JP | 4474869 | 3/2005 |
| JP | 3947799 | 8/2005 |
| JP | 2006-224275 | 8/2006 |
| JP | 4948389 | 8/2007 |
| KR | 10-2009-0059721 | 6/2009 |

* cited by examiner

CONVERGENCE MACHINING APPARATUS BASED ON TURNING

CROSS-REFERENCE TO RELATED APPLICATION

This application claims priority to and the benefit of Korean Patent Application Nos. 10-2013-00122645 and 10-2013-00122646 filed in the Korean Intellectual Property Office on Oct. 15, 2013, the entire contents of which are incorporated herein by reference.

BACKGROUND OF THE INVENTION (a) Field of the Invention

The present invention relates to a convergence machining apparatus based on turning. More particularly, the present invention relates to a convergence machining apparatus based on turning by performing a process in a state that a work piece is rotated.

(b) Description of the Related Art

FIG. 1 schematically discloses a conventional turning machining apparatus as a background technique of the present invention.

As shown in FIG. 1, according to a basic structure of a conventional turning machining apparatus, a slide surface B-S is formed on a bed B, and a reciprocal carriage R mounted with a processing module T is transferred according to the slide surface B-S. Further, a cylindrical work piece S is mounted and processed between a headstock (not shown) and a footstock (not shown).

On the other hand, the processing module T (for example, a turning processing tool) capable of controlling a processing depth is mounted at one side of the work piece S.

However, in the conventional turning machining apparatus, a relative displacement may be generated during the processing due to an offset error (Ex, Ey) between the slide surface B-S and a rotation center C of the work piece. This is because the work piece is slightly moved during the processing in an arrow (V) direction shown on the work piece S of FIG. 1 and it acts as a cause of accuracy deterioration according to the relative displacement between the tool and the work piece.

In other words, in a machining apparatus requiring high accuracy processing, the offset error generated in the processing acts as a main cause of deteriorating the processing accuracy such that it is necessary to be improved.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a convergence machining apparatus based on turning that prevents an offset error in a process due to a relative displacement between a work piece and a tool installed to a reciprocal carriage by positioning a rotation center of the work piece installed to a headstock and a footstock and a slide surface of first and second beds mounted with a reciprocal carriage, the headstock, and the footstock on the same virtual line when viewed from a direction parallel with a rotation axis of the work piece. The reciprocal carriage may be supported by the first and second beds to be positioned outside a width region of the headstock and the footstock and may include first and second main reciprocal carriages.

The same virtual line may be a horizontal line.

The same virtual line may be an inclination line having an inclination angle θ of 0<θ<90° when the same line is the horizontal line.

At least one of the first and second main reciprocal carriages may have a cutting module.

The cutting module may be one of a fast tool servo (FTS) processing module installed to be toward the rotation center of the work piece and performing FTS processing and a milling processing module installed to be toward the rotation center of the work piece and performing milling processing.

One of the first and second main reciprocal carriages may be installed with an FTS processing module installed to be toward the rotation center of the work piece and performing FTS processing, and the other of the first and second main reciprocal carriages may be installed with a milling processing module installed to be toward the rotation center of the work piece and performing milling processing.

The first and second main reciprocal carriage may respectively include an angle controller controlling an installation angle of the cutting module in a length direction of the work piece.

The first and second main reciprocal carriages may be mutually connected by an assistance reciprocal carriage with an arch shape.

The assistance reciprocal carriage may include a plurality of processing modules having a front end installed to be toward the rotation center of the work piece and performing different processes from each other.

A plurality of processing modules may include at least two of a milling processing module installed to be transferred toward the rotation center of the work piece and performing milling processing, a laser processing module performing laser processing, and a grinding processing module performing grinding processing.

The headstock may include a headstock holder enclosing a headstock periphery, and the footstock may include a footstock holder enclosing a footstock periphery.

The first and second beds may include a fluid circulation part in which a fluid exhausted from a hydrostatic bearing is circulated.

The convergence machining apparatus may further include a base supporting the first and second beds, and the base may be formed of a truss structure of a honeycomb shape.

DETAILED DESCRIPTION OF THE EMBODIMENTS

Figure 1:
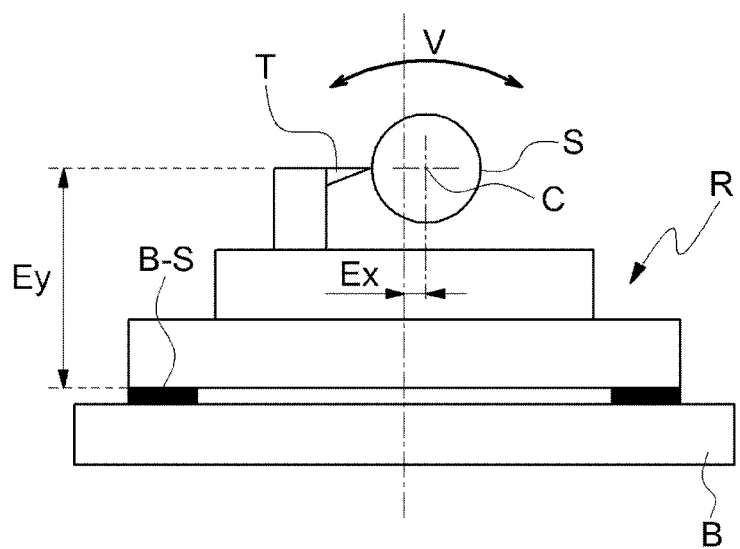
FIG. 1 is a schematic view of a conventional turning machining apparatus.

The advantages and characteristics of the present invention and a technique of achieving the same will become more apparent by describing exemplary embodiments in detail with reference to the accompanying drawings. However, the present invention is not limited to the exemplary embodiments disclosed hereinafter, but has many variations. The exemplary embodiments described hereinafter are provided to make the disclosure of the present invention complete and to completely inform a person of ordinary skill in the art the scope of the present invention. Like reference numerals designate like elements throughout the specification.

In the following description, the technical terms are used only to explain a specific exemplary embodiment while not limiting the present invention. The terms of a singular form may include plural forms unless referred to the contrary. The meaning of "include" specifies a property, a region, a fixed number, a step, a process, an element, and/or a component, but does not exclude other properties, regions, fixed numbers, steps, processes, elements, and/or components.

Hereinafter, a convergence machining apparatus based on turning according to a preferable exemplary embodiment of the present invention will be described with reference to accompanying drawings.

Figure 2:
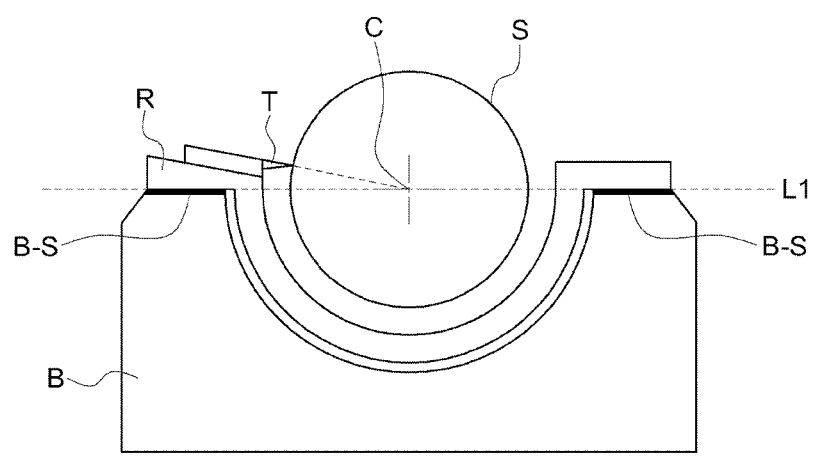
FIG. 2 is a schematic view of a convergence machining apparatus based on turning according to a first exemplary embodiment of the present invention.

FIG. 2 is a schematic view of a convergence machining apparatus based on turning according to a first exemplary embodiment of the present invention.

Referring to FIG. 2, in a case of a convergence machining apparatus based on turning according to an exemplary embodiment of the present invention, a rotation center C of a work piece S fixed by a headstock and a footstock that are not shown and a slide surface B-S of a bed B in which a reciprocal carriage R is mounted with a processing module T, the headstock, and the footstock are guided and transferred and are horizontally positioned according to the same virtual straight line L1 when viewed from a direction parallel with a rotation axis of the work piece S. That is, when the work piece S fixed by the headstock and the footstock rotates at the rotation center C on a rotation axis, the rotation axis is positioned on the same virtual plane surface as the slide surface B-S of the bed B.

The rotation center C of the work piece S may be a point at which a cross-section that is cut in a plane perpendicular to a rotation axis of the work piece S and the rotation axis meet each other. The virtual plane surface may be a plane surface formed by the rotation axis and the virtual straight line L1. Also, the slide surface B-S of the bed B is a surface on which the reciprocal carriage R is mounted while the processing module T is supported and transferred, and may be a surface supporting the headstock and footstock thereby supporting the work piece S. Accordingly, based on Abbe's principle, dynamic, static, and thermal stability may be obtained, thereby reducing a processing error. Accordingly, generation of an offset error may be prevented in processing according to a position deviation therebetween In the conventional art, as shown in FIG. 1, the position deviation (offset, Ex, Ey) exists between the slide surface B-S of the bed B and the rotation center C of the work piece S in a longitudinal direction or a transverse direction, and this causes a relative displacement by a moment generated in the processing.

Accordingly, in the present exemplary embodiment, as shown in FIG. 2, the rotation center C of the work piece S fixed to the headstock and the footstock, and the slide surface BS of the bed B on which the reciprocal carriage R, the headstock, and the footstock are mounted are positioned on the same line L1, thereby preventing the offset error.

The concept of the present invention confirmed through the convergence machining apparatus based on turning shown in FIG. 2 is more clearly described through a detailed exemplary embodiment of the convergence machining apparatus based on turning shown in FIG. 3 to FIG. 11.

Figure 3:
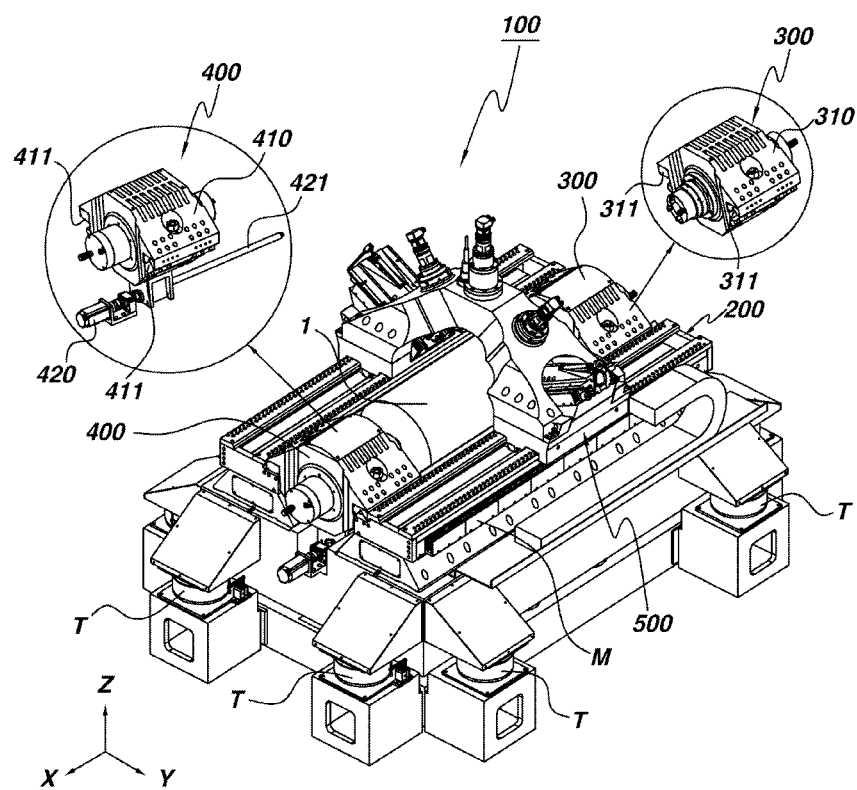
FIG. 3 is a detailed perspective view of a convergence machining apparatus based on turning according to a first exemplary embodiment of the present invention.
Figure 4:
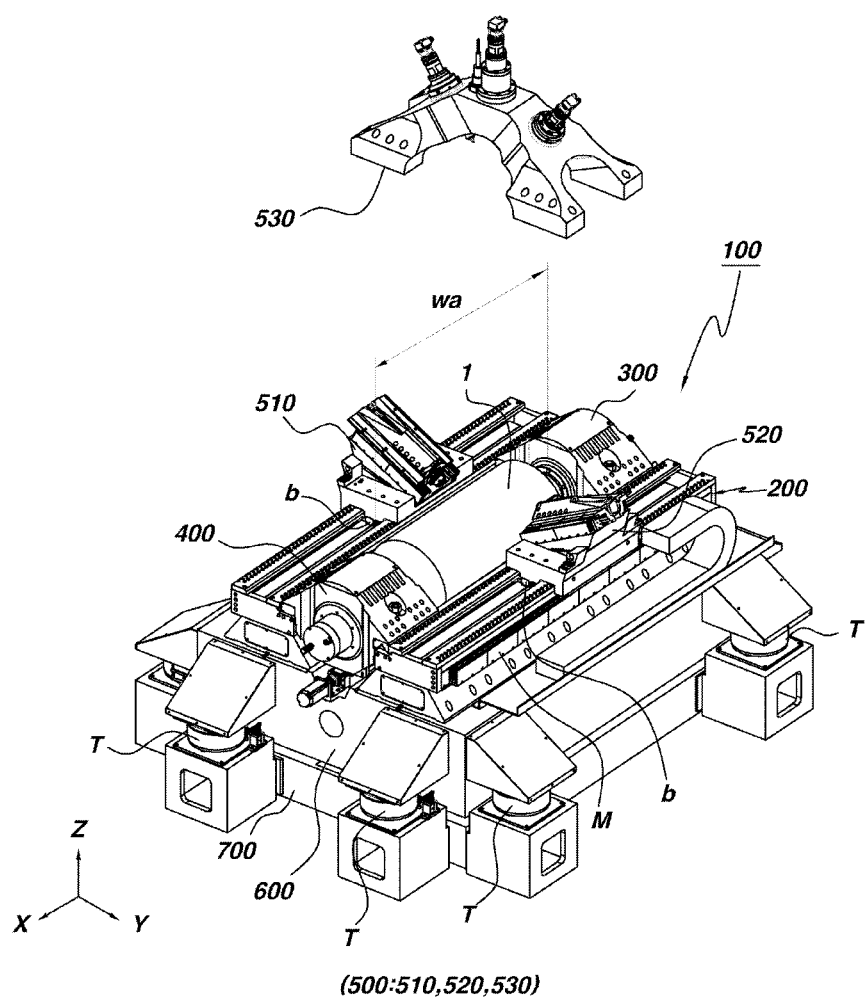
FIG. 4 is a perspective view separately showing an assistance reciprocal carriage in a convergence machining apparatus based on turning according to a first exemplary embodiment of the present invention.
Figure 5:
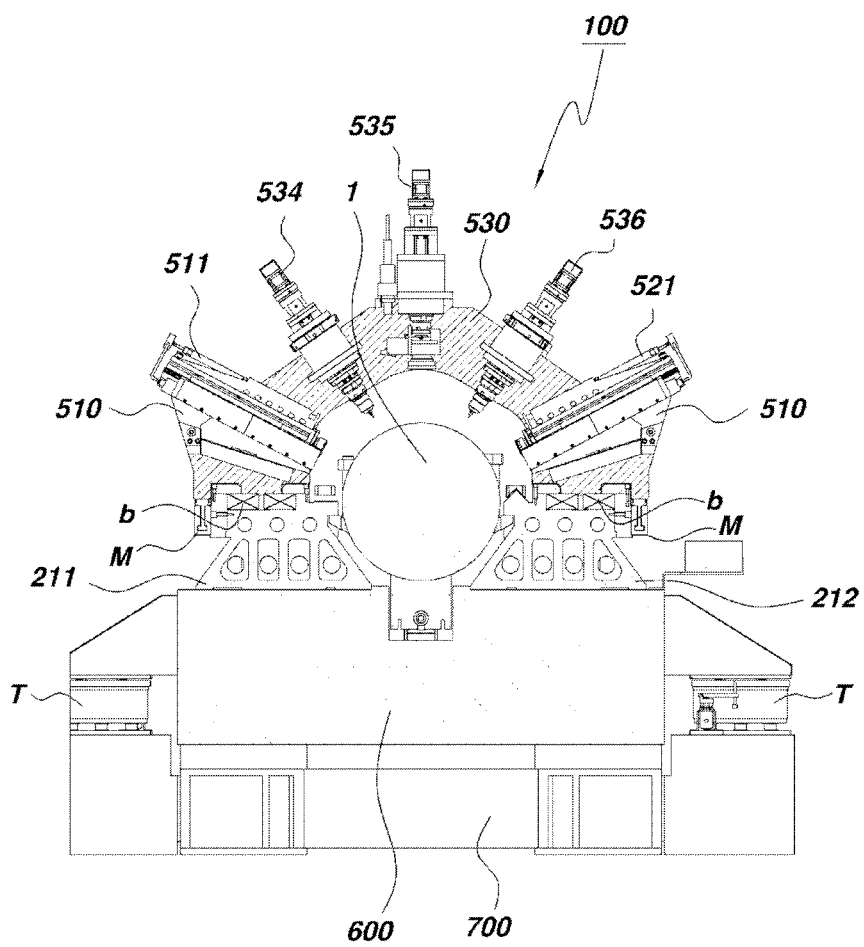
FIG. 5 is a width direction cross-sectional view of a convergence machining apparatus based on turning according to a first exemplary embodiment of the present invention.

FIG. 3 is a detailed perspective view of a convergence machining apparatus based on turning according to a first exemplary embodiment of the present invention, FIG. 4 is a perspective view separately showing an assistance reciprocal carriage in a convergence machining apparatus based on turning according to a first exemplary embodiment of the present invention, and FIG. 5 is a width direction cross-sectional view of a convergence machining apparatus based on turning according to a first exemplary embodiment of the present invention.

As described above, the convergence machining apparatus based on turning 100 of the present invention based on the offset error preventing structure, as shown in FIG. 3 to FIG. 5, includes a bed 200, a headstock 300, a footstock 400, and a reciprocal carriage 500.

Figure 6:
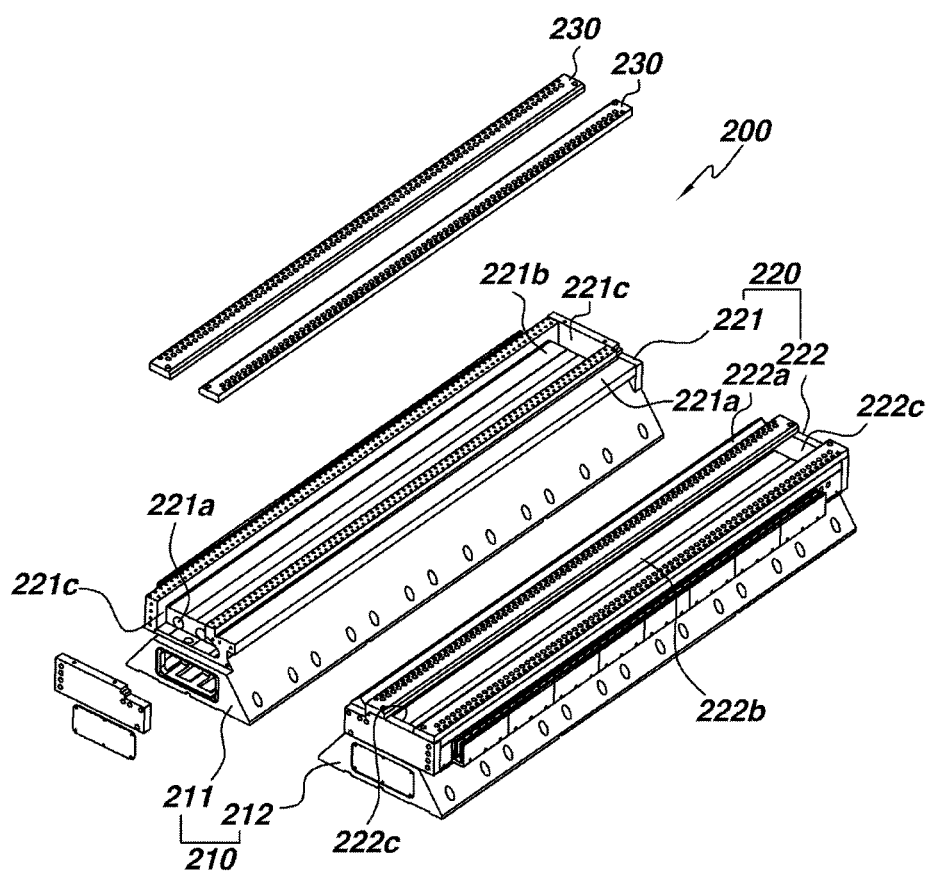
FIG. 6 is an exploded perspective view of a bed in a convergence machining apparatus based on turning according to a first exemplary embodiment of the present invention.
Figure 7:
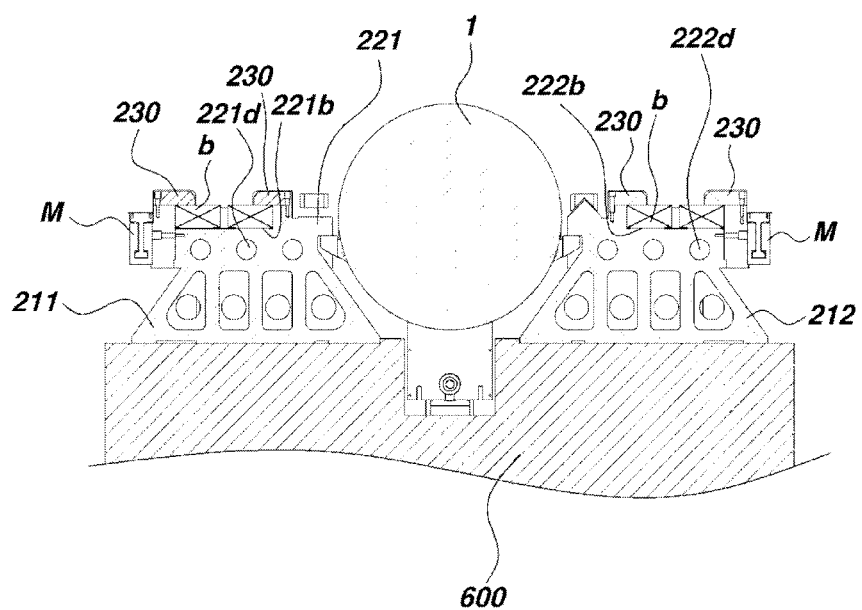
FIG. 7 is a width direction cross-sectional view of a bed in a convergence machining apparatus based on turning according to a first exemplary embodiment of the present invention.

FIG. 6 is an exploded perspective view of a bed in a convergence machining apparatus based on turning according to a first exemplary embodiment of the present invention, and FIG. 7 is a width direction cross-sectional view of a bed in a convergence machining apparatus based on turning according to the first exemplary embodiment of the present invention.

As shown in FIG. 6 and FIG. 7, the bed 200 includes a first bed 211 and a second bed 212 horizontally disposed in parallel in the width direction at both sides of the convergence machining apparatus based on turning 100 so as to support both ends of the headstock 300, the footstock 400, and the reciprocal carriage 500 in the width direction.

Here, the first and second beds 211 and 212 may be formed with the same size and weight, and the first and second beds 211 and 212 may each include a reinforcement member having the same shape, size, and weight for increasing strength thereof. Accordingly, the beds 211 and 212 have identical structural vibration characteristics.

Also, the first and second beds 211 and 212 may each have width direction cross-sections forming an isosceles triangle shape for structural stability. The isosceles triangle shape may maintain the stability against a load respectively acting on the beds 211 and 212 such that straightness may be maintained.

The bed 200 may include a rail base 220 disposed thereon. The rail base 220 consists of a first rail base 221 and a second rail base 222 respectively disposed on the first bed 211 and the second bed 212.

Mounting parts 221a and 222a are mounted in the width direction ends of the headstock 300 and footstock 400 at one side (a portion close to the work piece) of each upper surface of the first and second rail bases 221 and 222.

For the first and second rail bases 221 and 222, receiving parts 221b and 222b receiving a hydrostatic bearing b that will be described later are formed along a length direction of each rail base.

Inside the bottom of the receiving parts 221b and 222b, fluid circulation parts 221d and 222d introduced with a fluid exhausted from the hydrostatic bearing while being communicated through communication parts 221c and 222c of the length direction both ends of the receiving part are formed along the length direction of the rail base.

Accordingly, as the fluid of which the temperature is increased by movement heat of the hydrostatic bearing b is circulated into the fluid circulation parts 221d and 222d through the receiving parts 221b and 222b and the communication parts 221c and 222c, thermal equilibrium of which a temperature difference is small is formed in an inner and outer structure of each rail base 221 and 222 such that thermal deformation of the rail base is prevented according to a reduction of a temperature deviation of each part of the rail base.

Here, the first bed 211 and the first rail base 221, and the second bed 212 and the second rail base 222, may be formed of an integral metal casting body to uniformly maintain specific gravity.

The bed 200 may include a guide rail 230 installed at the upper surface on which the mounting parts 221a and 222a of the first and second rail bases 221 and 222 are not formed.

Bottom surfaces of first and second main reciprocal carriages 510 and 520 that will be described later are mounted to slide at the guide rail 230 of each rail base. Here, the bottom surface of the guide rail 230 is the sliding surface s on which the first and second main reciprocal carriages 510 and 520 are guided, as described above, and the center of the hydrostatic bearing b positioned under the sliding surface and the rotation center C of the work piece 1 are disposed on the same horizontal line when viewed from a direction parallel with the rotation axis of the work piece 1.

The guide rail 230 has a main role of guiding the first and second main reciprocal carriages 510 and 520, however they together have a cap role of preventing the fluid that is ejected upward from the hydrostatic bearing b received by the receiving part 221b and 222b of the rail bases 221 and 222 from being leaked to the outside.

Again referring to FIG. 3 and FIG. 4, the headstock 300 has a function of rotating one end of the work piece 1 while fixing it in place.

The headstock 300 has a circumferential surface enclosed by a headstock holder 310, and both ends of the width direction of the headstock holder 310 have a hooking jaw 311 that is mounted at one end of the mounting parts 221a and 222a of the first and second rail bases 221 and 222.

Also, the headstock holder 310 has a reinforcing member structure of a heat dissipating fin shape, thereby improving cooling performance.

Referring to FIG. 3 and FIG. 4, the footstock 400 has a function of supporting the other end of the work piece 1, that is, an opposite end supported by the headstock 300 to be rotated.

The footstock 400 has a circumferential surface enclosed by the footstock holder 410, and both ends in the width direction of the footstock holder 410 have a hooking jaw 411 that is mounted to the other end of the mounting parts 221a and 222a of the first and second rail bases 221 and 222.

Here, the footstock holder 410 is coupled to a screw shaft 421 rotated by a driving motor 420, thereby being transferred linearly according to rotation of the screw shaft 421 (referring to FIG. 3).

Also, the footstock holder 410 has a reinforcing member structure of the heat dissipating fin shape, thereby improving cooling performance, like the headstock holder.

Figure 8:
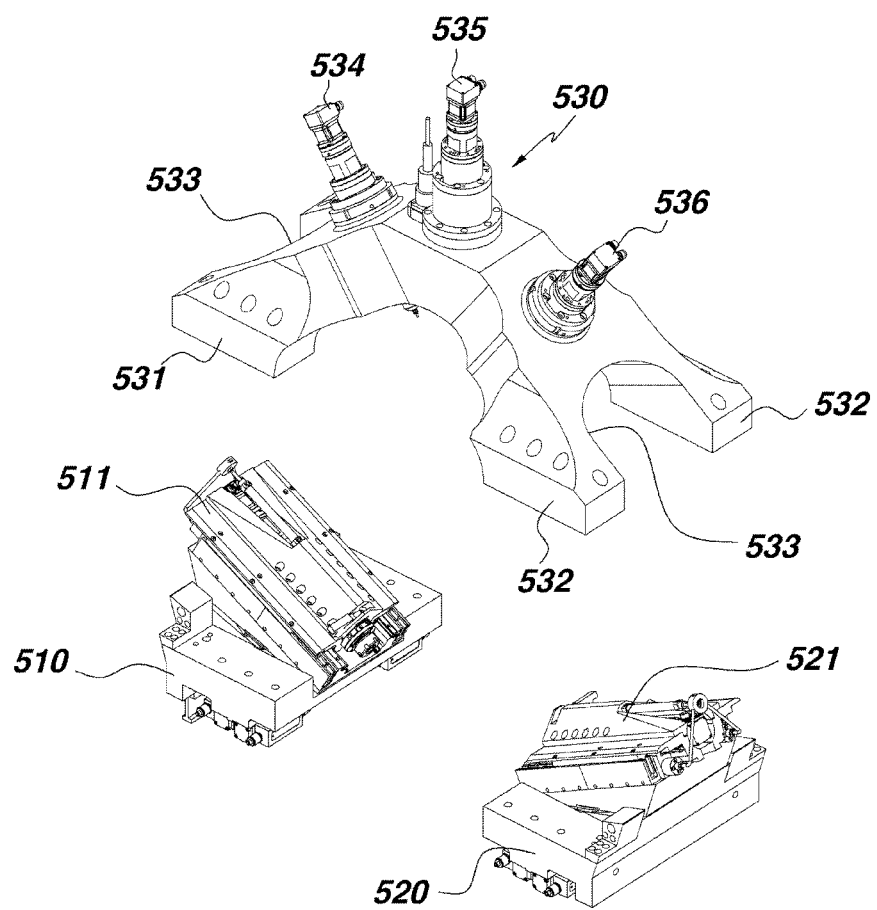
FIG. 8 is an exploded perspective view of a reciprocal carriage in a convergence machining apparatus based on turning according to a first exemplary embodiment of the present invention.

FIG. 8 is an exploded perspective view of a reciprocal carriage in a convergence machining apparatus based on turning according to a first exemplary embodiment of the present invention.

Referring to FIG. 8 and FIG. 6, the reciprocal carriage 500 processes the work piece 1 while reciprocally sliding along the guide rail 230 of the bed 200.

The reciprocal carriage 500 includes first and second main reciprocal carriages 510 and 520 and an assistance reciprocal carriage 530.

While the first and second main reciprocal carriages 510 and 520 are disposed outside a width region ba of the headstock 300 and the footstock 400, they are supported by the first and second beds 211 and 212.

At this time, since the first and second main reciprocal carriages 510 and 520 are installed on the guide rail 230 disposed at a position where the mounting parts 221a and 222a of the first and second rail bases 221 and 222 to which the headstock 300 and the footstock 400 are mounted are not formed, they may be freely moved on an entire area of the guide rail 230 without interference with the headstock 300 and the footstock 400.

Figure 10:
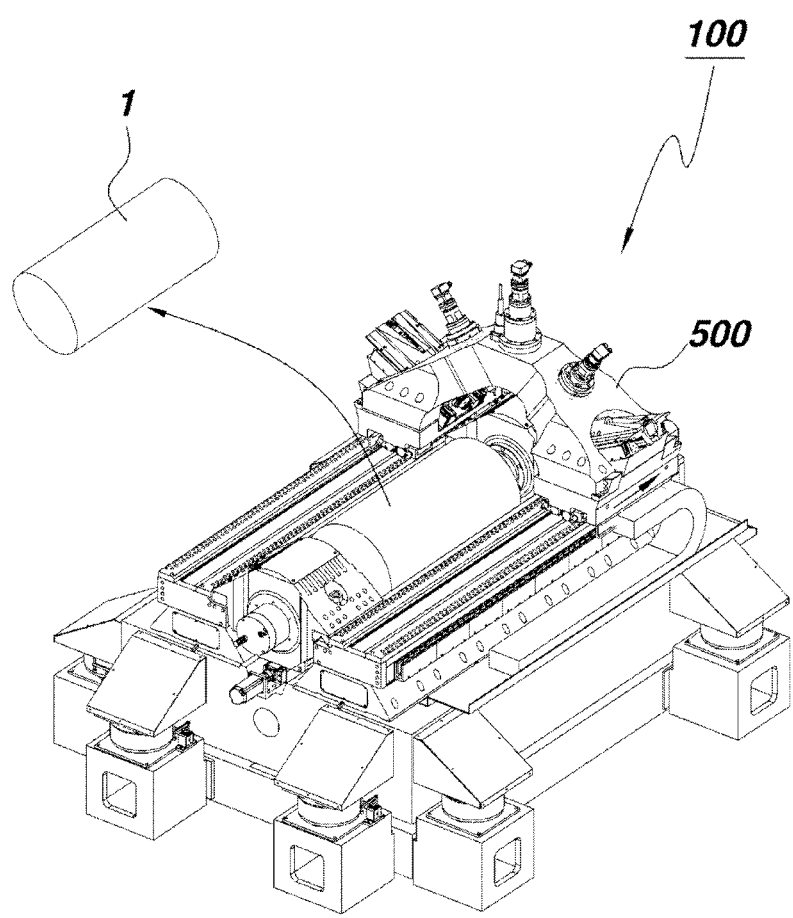
FIG. 10 is a state view separately showing a work piece in a convergence machining apparatus based on turning according to a first exemplary embodiment of the present invention.

Accordingly, as shown in FIG. 10, when loading or unloading the work piece 1 between the headstock 300 and the footstock 400, the work piece 1 is loaded or unloaded in a state that the first and second main reciprocal carriages 510 and 520 are moved at a position overlapping the headstock 300 or the footstock 400 to avoid a work area wa such that the loading and unloading are easily performed without disassembling the reciprocal carriage 500. Accordingly, a loading and unloading time may be reduced and a working time may also be reduced.

Again referring to FIGS. 3 to 7, the first and second main reciprocal carriages 510 and 520 are sliding-operated with a non-friction method by the hydrostatic bearing b installed to the first and second rail bases 221 and 222 and a linear motor M.

In further details, while the hydrostatic bearing b is fixed to the bottom surface of the first and second main reciprocal carriages 510 and 520, the hydrostatic bearing b is respectively implemented to the receiving part 221b and 222b of the first and second rail bases 221 and 222.

Here, the hydrostatic bearing b ejects a fluid in three directions of an upper direction, a side direction, and a lower direction such that the first and second main reciprocal carriages 510 and 520 are levitated from the bottom surface of the receiving parts 221b and 222b by an ejection force of the fluid.

A hydrostatic bearing b is described above, but other bearings capable of sliding the first and second reciprocal carriages 510 and 520 may be applied.

The linear motor M provides power to move the levitated first and second main reciprocal carriages 510 and 520 along the guide rail 230. Accordingly, the first and second main reciprocal carriages 510 and 520 are linearly moved without friction or noise.

Among the first and second lower reciprocal carriages 510 and 520, one reciprocal carriage may be mounted with a fast tool servo (FTS) processing module 511 performing FTS processing, and the other reciprocal carriage may be mounted with a turning processing module 521 performing turning processing (work of processing the work piece with a cylindrical shape or a circular conical shape).

On the other hand, when the first and second main reciprocal carriages 510 and 520 are not connected by the assistance reciprocal carriage 530, a plurality of processing modules may be installed to each main reciprocal carriage.

Figure 9:
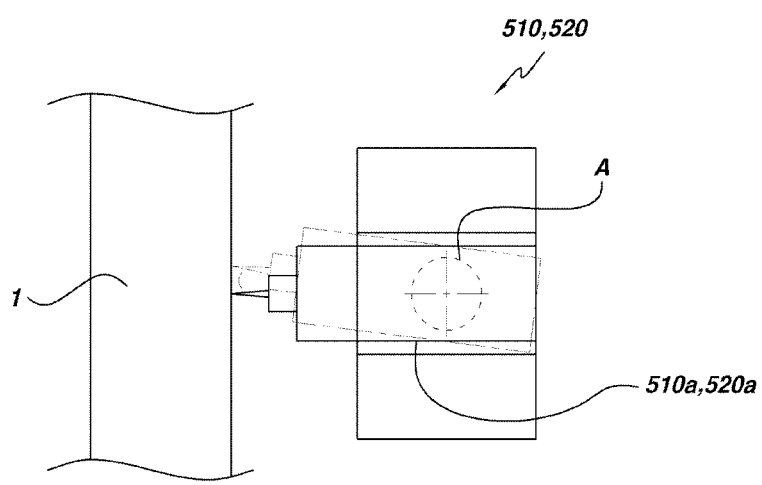
FIG. 9 is a plane view showing a state of aligning a main reciprocal carriage in a convergence machining apparatus based on turning according to a first exemplary embodiment of the present invention.

In addition, as shown in FIG. 9, the first and second main reciprocal carriages 510 and 520 include an angle controller A to control a processing angle with respect to the work piece 1 and to displace each of tool posts 510a and 520a with a predetermined rotation angle in the length direction of the work piece 1 to control squareness with the work piece 1.

Here, if the tool posts 510a and 520a are perpendicular to the work piece 1, cylinder processing of an exterior diameter is uniform, while if the tool posts 510a and 520a are oblique to the work piece 1, the exterior diameter of the work piece 1 may be tapered-processed.

Referring to FIG. 8, the assistance reciprocal carriage 530 with a function of mutually connecting the first and second main reciprocal carriages 510 and 520 may have an arch that is concave downward.

The assistance reciprocal carriage 530 has a pair of first binding parts 531 coupled to both sides of the upper surface of the first main reciprocal carriage 510 and a pair of second binding parts 532 coupled to both sides of the upper surface of the second main reciprocal carriage 520.

In addition, between the first binding parts 531 and between the second binding parts 532, a tunnel part 533 is formed to pass through and install the processing module of each lower reciprocal carriage toward the work piece.

A milling processing module 534 performing milling processing, a laser processing module 535 performing laser processing, and a grinding processing module 536 performing grinding processing may be mounted to the assistance reciprocal carriage 530.

Here, the end of the tool mounted to each processing module is installed with a radial structure toward the rotation center C of the work piece 1 for stable convergence processing, and the tool coupled to the processing module is transferred in the direction of the rotation center C of the work piece.

On the other hand, the convergence machining apparatus based on turning 100 of the present invention, as shown in FIGS. 4 to 6, may further include a base 600 mounted at the upper surface of both sides of the width direction of the bed 200 and a sub-base 700 to which the base 600 is elastically mounted through an elastic member T.

The base 600 may be formed of a granite material for thermal distortion suppression and a damping effect.

In this case, the base 600 and a bed 210 mounted to the base are fastened by a bolt, however the base 600 and the bed 210 are formed of different materials such that thermal distortion due to a thermal expansion coefficient difference may be generated.

Accordingly, by strongly fixing the base and the bed by shrinkage fitting and installing a key at an interface part of the base 600 and the bed 210, the thermal distortion may be suppressed.

Figure 11:
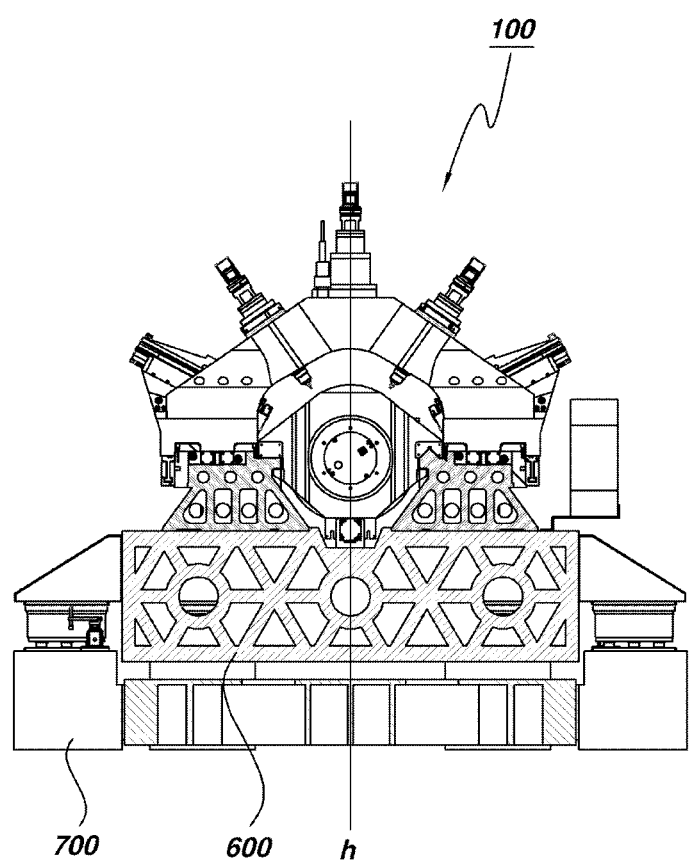
FIG. 11 is a cross-sectional view of a base of a convergence machining apparatus based on turning according to a first exemplary embodiment of the present invention.

Differently from this, as shown in FIG. 11, the base 600 as a casting of a metal material may be formed of a truss structure of a honeycomb structure connected with an equilateral triangle member.

For example, when viewing the base 600 in the width direction, the truss structure is formed of the honeycomb structure in which both sides are symmetrical with reference of a vertical center line h, thereby both sides of the vertical center line h may have a stable structure by balancing.

The honeycomb structure, for example, the truss structure of the honeycomb shape, is realized by radially and hexagonally arranging equilateral triangle members at a periphery with reference to a circular hole of a center thereof such that deformation is not easily generated against the dynamic and static load applied on the bed and the stable state may be maintained.

Figure 12:
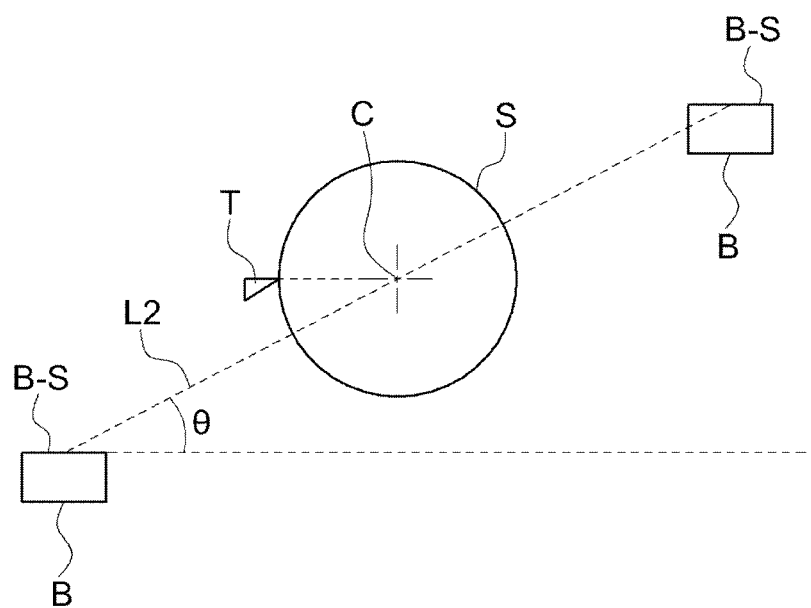
FIG. 12 is a schematic view of a convergence machining apparatus based on turning according to a second exemplary embodiment of the present invention.

FIG. 12 is a schematic view of a convergence machining apparatus based on turning according to a second exemplary embodiment of the present invention.

In a case of an exemplary embodiment shown in FIG. 12, the rotation center C of a work piece S fixed by the headstock and the footstock that are not shown and the slide surface B-S of the bed B mounted with the reciprocal carriage, the headstock, and the footstock are positioned on the same virtual line when viewed from a direction parallel with the rotation axis of the work piece, as described above, however the same virtual line L2 of the present exemplary embodiment is a gradient with a predetermined inclination angle θ with respect to horizontal, differently from the same virtual line L1 of FIG. 2.

Here, the inclination angle θ is preferably in a range of $0<\theta<90$.

Figure 13:
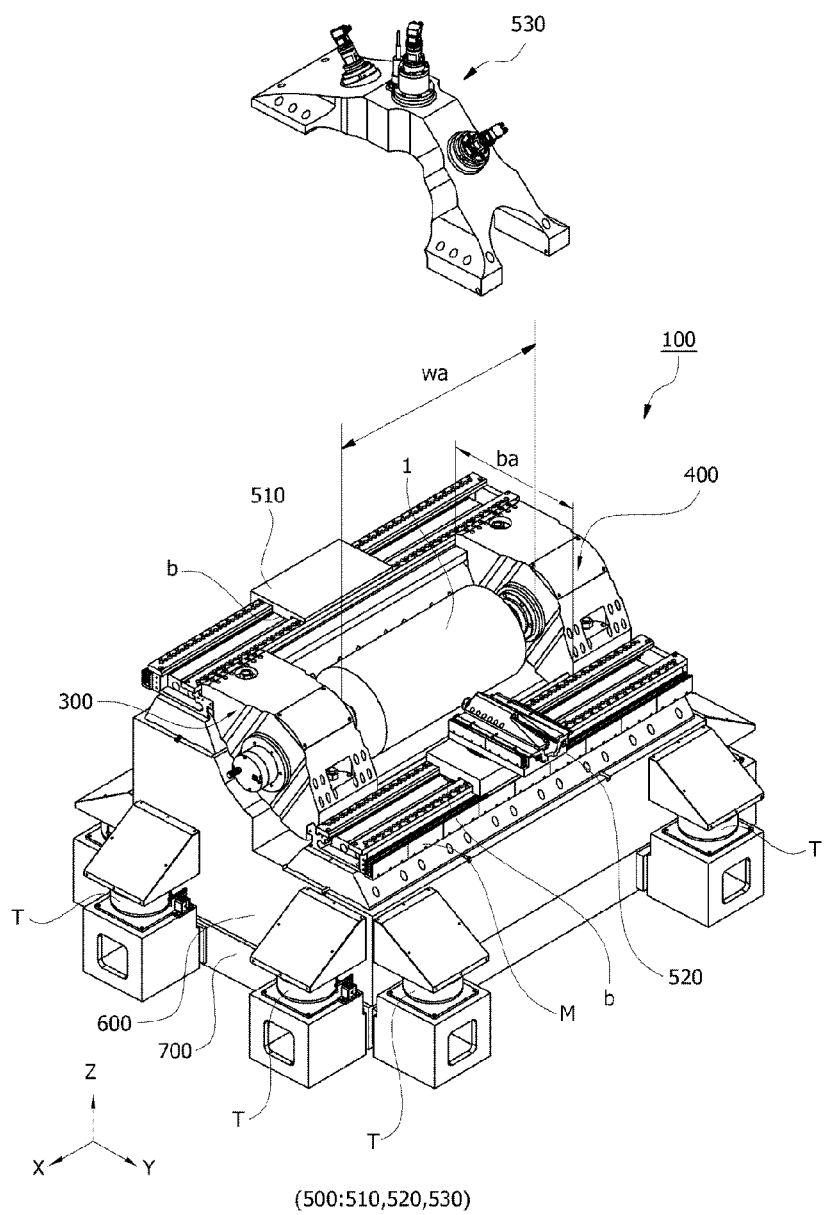
FIG. 13 is a partial exploded perspective view of a convergence machining apparatus based on turning according to a second exemplary embodiment of the present invention.
Figure 14:
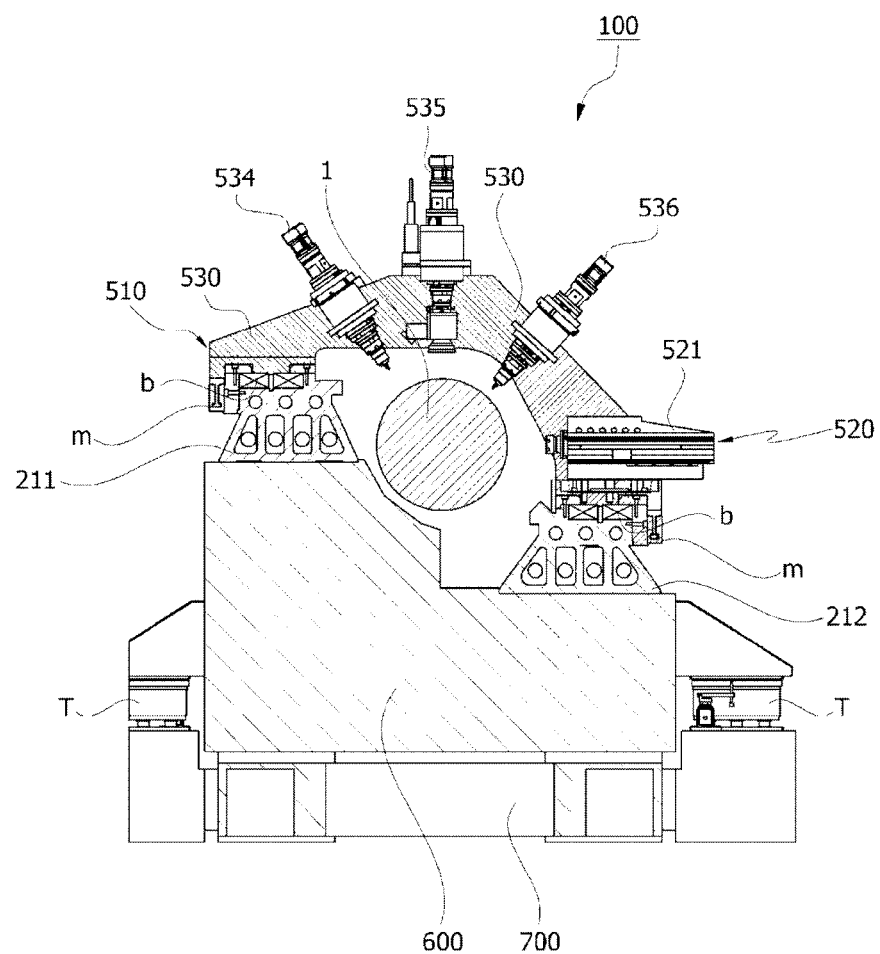
FIG. 14 is a width direction cross-sectional view of a convergence machining apparatus based on turning according to a second exemplary embodiment of the present invention.

FIG. 13 is a partial exploded perspective view of a convergence machining apparatus based on turning according to a second exemplary embodiment of the present invention, and FIG. 14 is a width direction cross-sectional view of a convergence machining apparatus based on turning according to a second exemplary embodiment of the present invention.

Referring to FIGS. 13 and 14, a convergence machining apparatus based on turning 100 according to the second exemplary embodiment is the same as most of the described first exemplary embodiment, however, in an exceptional case, among the main reciprocal carriage positioned at the upper side, the first and second main reciprocal carriages 510 and 520 may not be installed with the processing module due to a disadvantageous position. In contrast, among the first and second main reciprocal carriages 510 and 520, the FTS processing module 511 or the turning processing module 521 may be selectively installed at the main reciprocal carriage positioned at the lower side.

Figure 15:
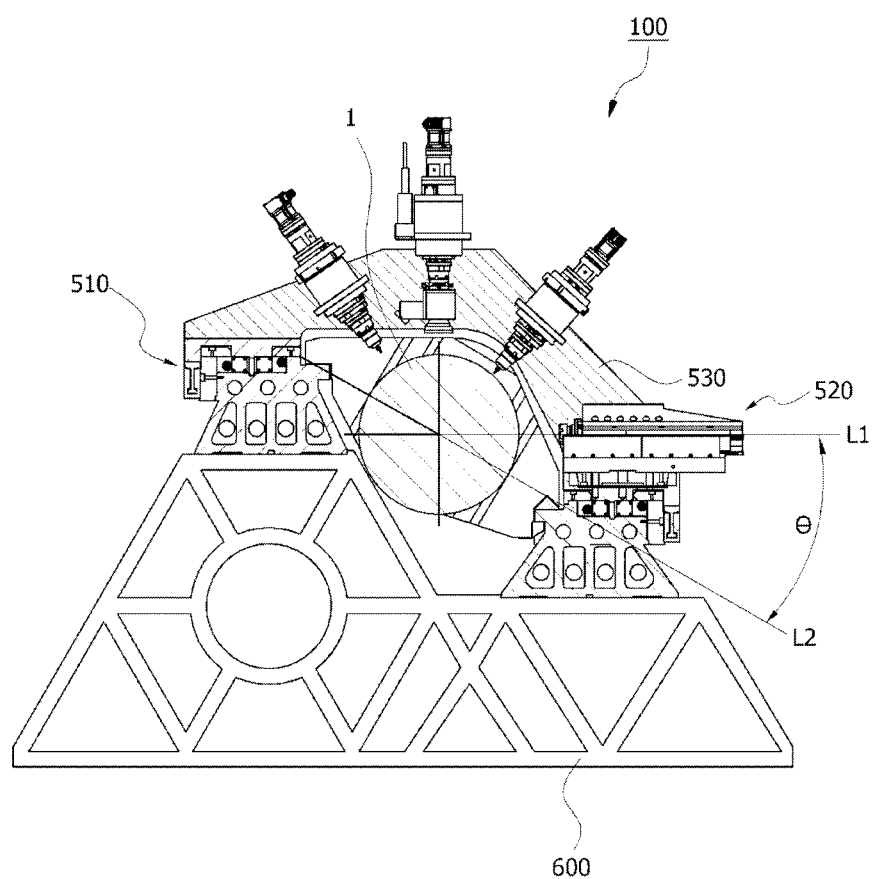
FIG. 15 is a diagram of an inclination angle 1 of a convergence machining apparatus based on turning according to a second exemplary embodiment of the present invention.

In a case of FIG. 15, when the main reciprocal carriage positioned at the front is referred to as a first main reciprocal carriage 510 and the main reciprocal carriage positioned at the rear is referred to as a second main reciprocal carriage 520, the straight line L2 connecting the slide surfaces of the first main reciprocal carriage 510 and the second main reciprocal carriage 520 is inclined by 30° with reference to the horizontal straight line L1 such that a worker in front of the first main reciprocal carriage 510 may easily view a work space, thereby realizing a good work condition.

Figure 16:
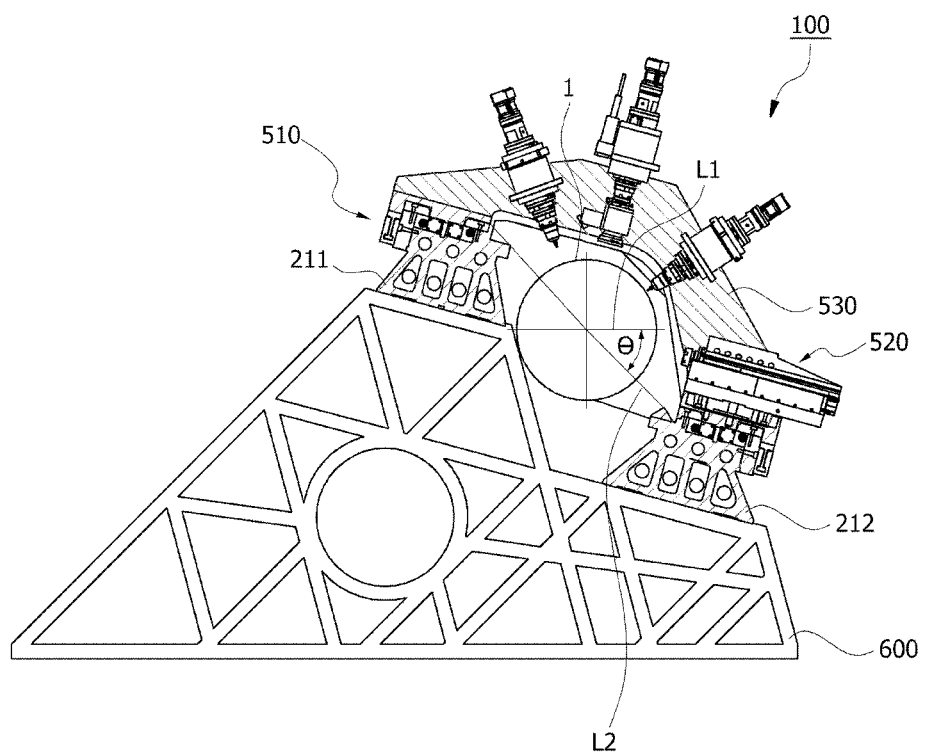
FIG. 16 is a diagram of an inclination angle 2 of a convergence machining apparatus based on turning according to a second exemplary embodiment of the present invention.

In a case of FIG. 16, the straight line L2 connecting the slide surfaces of the first main reciprocal carriage 510 and the second main reciprocal carriage 520 is inclined by 45° with reference to the horizontal straight line L1 such that the worker in front of the first main reciprocal carriage 510 may easily view the work space, thereby realizing the good work condition.

This is a relative merit of easily viewing the work space compared with the previous exemplary embodiment.

Meanwhile, the reference numerals of the drawings according to the second exemplary embodiment are the same as those according to the first exemplary embodiment such that the additional description is omitted.

Resultantly, the present invention positions the rotation center C of the work piece 1 fixed to the headstock 300 and the footstock 400 and the slide surface of the first and second beds 211 and 212 mounted with the reciprocal carriage 500, the headstock 300, and the footstock 400 on the same virtual line when viewed from a direction parallel with a rotation axis of the work piece, thereby preventing the offset error.

In addition, through the structure improvement of the reciprocal carriage 500, the movement may be realized on the entire area of the length direction of the guide rail without the collision with the headstock 300 and the footstock 400 such that the loading and the unloading of the work piece 1 may be easily performed as another characteristic.

It is to be understood that the invention is not limited to the disclosed embodiments, but the scope of the present invention will be represented by the appended claims rather than the above-described detailed description. In addition, it is to be interpreted that all of the changes and modifications drawn from the meaning and range of the claims and equivalent arrangements are included within the spirit and scope of the present invention.

DESCRIPTION OF SYMBOLS

1: work piece 100: convergence machining apparatus based on turning
200: bed 300: headstock
310: headstock holder 400: footstock
410: footstock holder 500: reciprocal carriage
510: first main reciprocal carriage 520: second main reciprocal carriage
530: assistance reciprocal carriage 600: base
700: sub-base

What is claimed is:

1. A convergence machining apparatus based on turning comprising:
    a headstock and a footstock on a slide surface of first and second beds, the headstock and a footstock fixing a work piece therebetween; and
    a reciprocal carriage installed with a tool, the reciprocal carriage being supported and transferred on the slide surface of the first and the second beds,
    wherein a rotation center of the work piece and a center of a width of the slide surface of the first and the second beds are positioned on a same virtual line when viewed from a direction parallel with a rotation axis of the work piece, thereby preventing an offset error in processing due to a relative displacement between the work piece and the tool, and
    wherein the reciprocal carriage is supported by the first and second beds to be positioned outside a width region of the headstock and the footstock.

2. The convergence machining apparatus of claim 1, wherein
    the same virtual line is a horizontal line.

3. The convergence machining apparatus of claim 1, wherein
    the same virtual line is an inclination line having an inclination angle θ of 0<θ<90° when the same line is the horizontal line.

4. The convergence machining apparatus of claim 1, wherein the reciprocal carriage includes first and second main reciprocal carriages, and at least one of the first and second main reciprocal carriages has a cutting module.

5. The convergence machining apparatus of claim 4, wherein
    the cutting module is one of a fast tool servo (FTS) processing module installed to be toward the rotation center of the work piece and performing FTS processing and a milling processing module installed to be toward the rotation center of the work piece and performing milling processing.

6. The convergence machining apparatus of claim 4, wherein
    one of the first and second main reciprocal carriages is installed with a fast tool servo (FTS) processing module installed to be toward the rotation center of the work piece and performing FTS processing, and
    the other of the first and second main reciprocal carriages is installed with a milling processing module installed to be toward the rotation center of the work piece and performing milling processing.

7. The convergence machining apparatus of claim 6, wherein
    the first and second main reciprocal carriages respectively include an angle controller controlling an installation angle of the cutting module in a length direction of the work piece.

8. The convergence machining apparatus of claim 4, wherein
    the first and second main reciprocal carriages are mutually connected by an assistance reciprocal carriage with an arch shape.

9. The convergence machining apparatus of claim 8, wherein
    the assistance reciprocal carriage includes a plurality of processing modules having a front end installed to be toward the rotation center of the work piece and performing different processes from each other.

10. The convergence machining apparatus of claim 9, wherein
    a plurality of processing modules include at least two of a milling processing module installed to be transferred toward the rotation center of the work piece and performing milling processing, a laser processing module performing laser processing, and a grinding processing module performing grinding processing.

11. The convergence machining apparatus of claim 1, wherein
    the headstock includes a headstock holder enclosing a headstock periphery, and the footstock includes a footstock holder enclosing a footstock periphery.

12. The convergence machining apparatus of claim 1, wherein
the first and second beds include a fluid circulation part in which a fluid exhausted from a hydrostatic bearing is circulated.

13. The convergence machining apparatus of claim 1, further comprising
a base supporting the first and second beds, wherein
the base is formed of a truss structure of a honeycomb shape.

* * * * *